Figure 5:
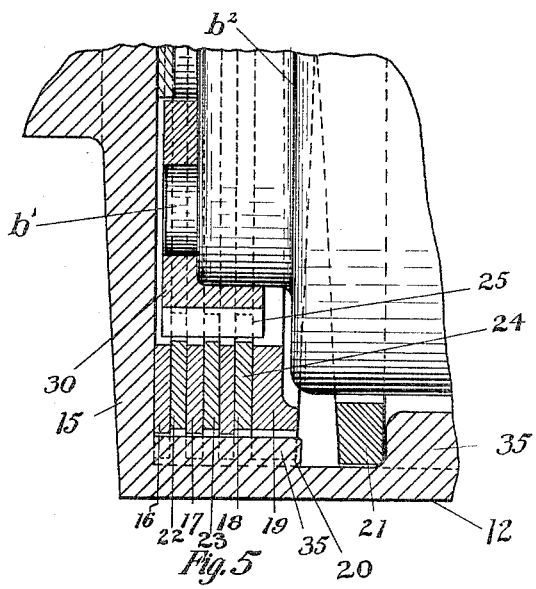

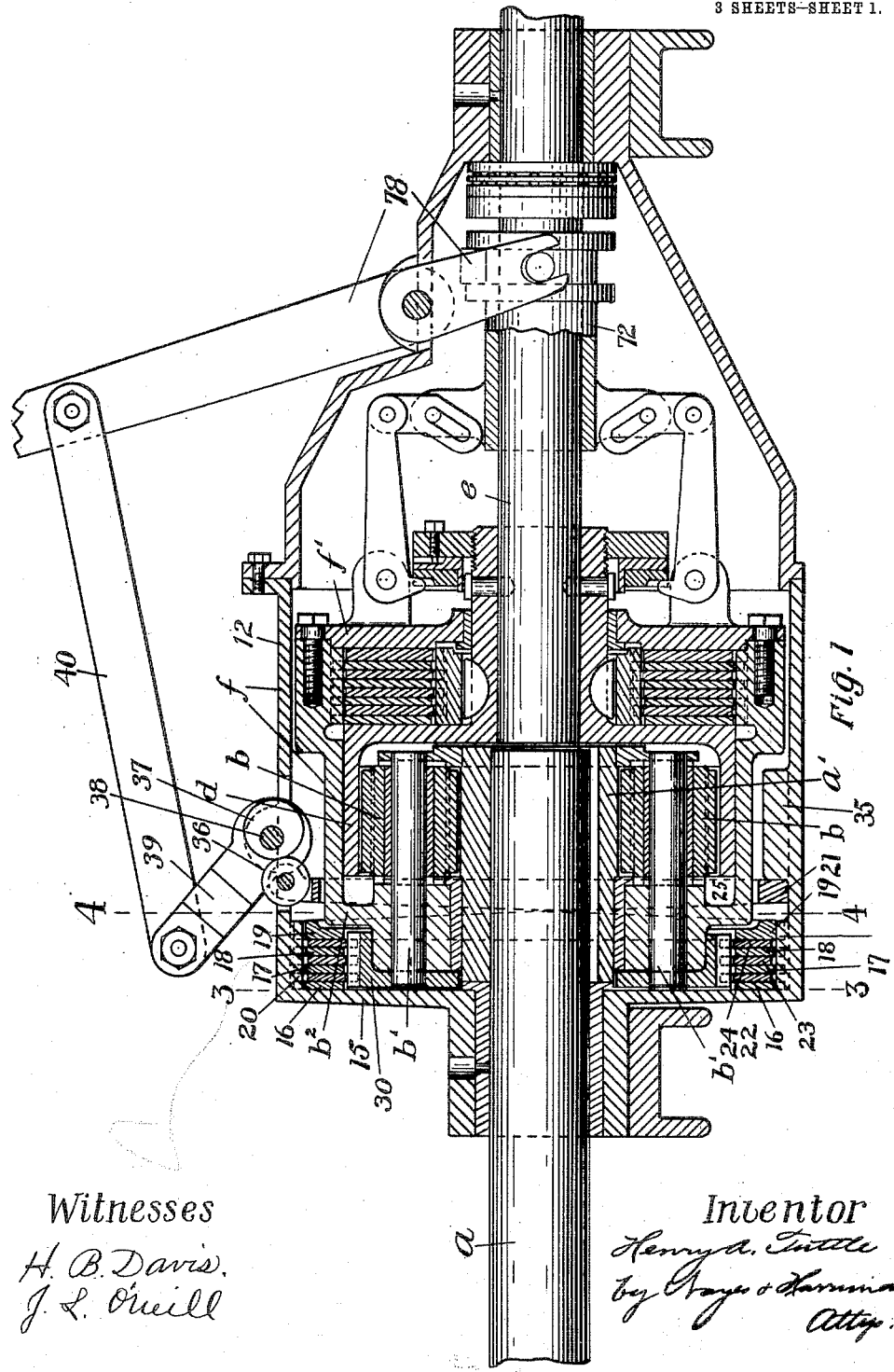

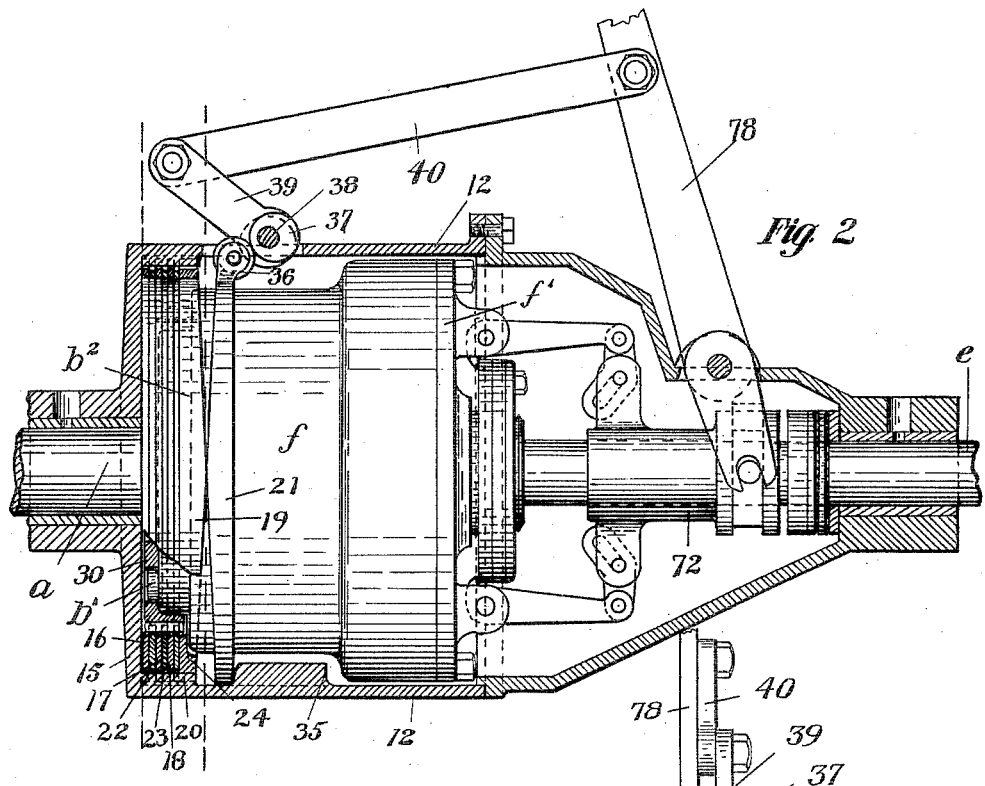
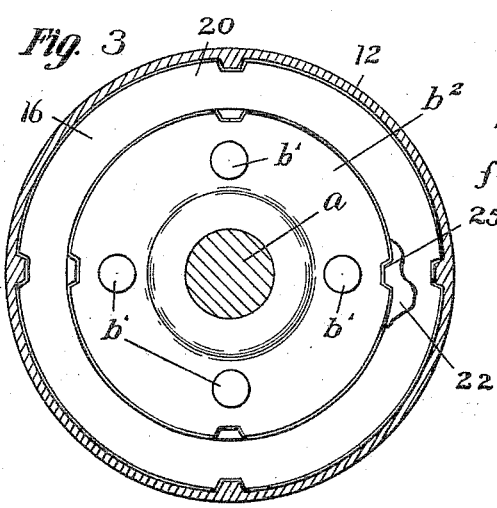
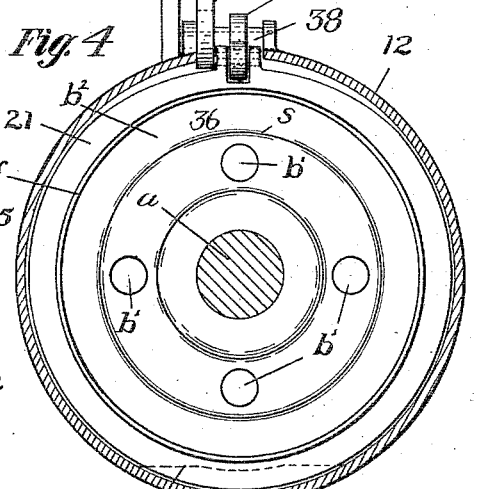

H. A. TUTTLE.
GEARING.
APPLICATION FILED MAY 26, 1911.

1,078,565.

Patented Nov. 11, 1913.

3 SHEETS—SHEET 3.

Witnesses
H. B. Davis.
J. L. O'Neill

Inventor
Henry A. Tuttle.
By Noyes & Harriman
Attys.

UNITED STATES PATENT OFFICE.

HENRY A. TUTTLE, OF TAUNTON, MASSACHUSETTS, ASSIGNOR TO EVANS STAMPING & PLATING COMPANY, OF TAUNTON, MASSACHUSETTS, A CORPORATION OF MASSACHUSETTS.

GEARING.

1,078,565.      Specification of Letters Patent.      Patented Nov. 11, 1913.

Application filed May 26, 1911. Serial No. 629,595.

*To all whom it may concern:*

Be it known that I, HENRY A. TUTTLE, a citizen of the United States, residing at Taunton, in the county of Bristol and State of Massachusetts, have invented an Improvement in Gearing, of which the following is a specification.

In the reversing gearing of Letters Patent #901,664, dated October 20, 1908, and in an improved form of reversing gearing forming the subject-matter of my application for Letters Patent Serial No. 629,596, filed May 26, 1911, a band-brake is provided to arrest or permit rotation of the carrier for the intermediate gears or pinions, said carrier being therein referred to as an inclosing-case and adapted, when restrained from rotation, to hold the supports for said gears or pinions at rest, in order that the gears or pinions may be revolved on their axes by a gear which is connected with the driving-shaft to in turn revolve a gear which is connected with the driven-shaft in a direction opposite to the direction of rotation of the driving-shaft.

From time to time it has been necessary to build reversing gearing larger and more powerful for use in connection with engines of greater horse-power, and while a friction brake of some sort is required, yet a band-brake of reasonable proportions is not as powerful as is desired. To meet this requirement an improved form of brake-mechanism for the pinion-carrier of reversing-gearing has been devised, which forms the subject matter of this application.

The present invention involves the employment of one or more friction-plates connected with a fixed support, and one or more friction-plates connected with and rotated by the pinion-carrier, and adapted to be moved into and out of engagement with the aforesaid non-rotatable plates to arrest said pinion-carrier, when in engagement, or to permit said pinion-carrier to revolve when out of engagement.

As a powerful brake-mechanism is required, usually several friction-plates will be connected with the fixed support, forming a set, and several friction-plates will be connected with the pinion-carrier, forming another set; and the plates of the two sets will be alternately disposed, and the plates of both sets, with the exception of the end plate of one set, which is stationary, are slidably connected respectively with the support and the carrier, and hence are movable axially, to permit them to engage and disengage each other, utilizing both sides of each plate as a friction surface, and means are provided to exert endwise pressure upon them, to move them axially and cause them to engage each other, which permits movements thereof in the opposite direction to disengage each other.

In the present embodiment of my invention the friction-plates of one set are supported by a stationary protecting shell, for the gearing, and arranged at the end of the carrier, and one end wall of said shell has a friction face adapting it to serve as a stationary friction-plate, while the remaining plates of said set are slidably connected with said shell, so as to be movable axially. The friction-plates of the other set are slidably connected with the carrier, so as to be movable axially, yet rotatable with and by said carrier. The pinion-carrier itself is here shown as movable axially for the purpose of operating clutch-mechanism by which it is connected with the driven-shaft, in order that said shaft may be revolved by and in the same direction as the driving-shaft, and slidably connecting the friction-plates with said carrier permits axial movement of the carrier independent of said plates, for the accomplishment of this result.

Figure 6:
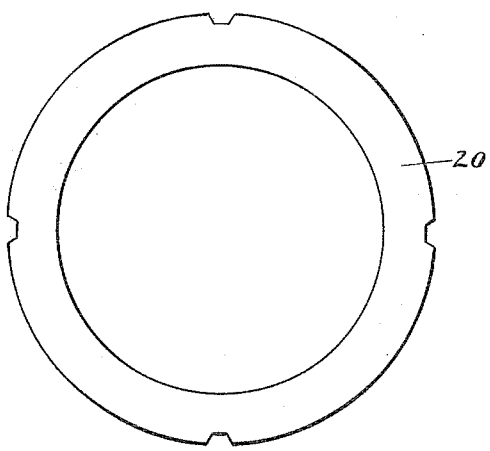
Figure 7:
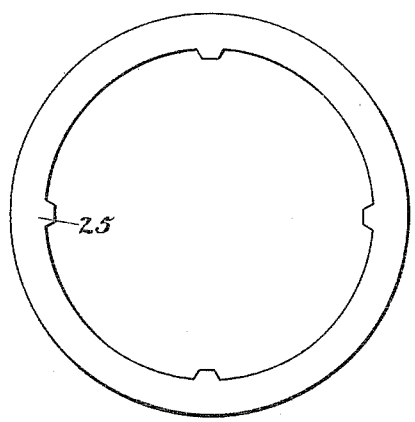

Figure 1 is a longitudinal vertical section of a reversing-gearing having brake-mechanism embodying this invention, the members of the brake-mechanism being in engagement. Fig. 2 is a side elevation and partial section of the reversing gearing and brake-mechanism. Fig. 3 is a transverse vertical section taken on the dotted line 3—3, Fig. 1. Fig. 4 is a transverse vertical section taken on the dotted line 4—4, Fig. 1. Fig. 5 is an enlarged sectional detail of a portion of the brake-mechanism. Fig. 6 is a detail of one of the non-rotatable friction-plates, and Fig. 7 is a similar view of one of the rotatable friction-plates.

The reversing-gearing here shown for the purpose of illustrating my invention, with the exception of the brake-mechanism, is substantially the same as in my aforesaid application #629,596, wherein $f$ represents the cylindrical body of the pinion-carrier or inclosing-case having an end wall $b^2$, bearing supports $b'$ on which intermediate gears or pinions b are mounted, which are arranged about and in engagement with a spur-gear a' secured to the driving-shaft a, and said pinions also are in engagement with an internal gear d, arranged concentrically in said cylindrical body f, and secured to the driven-shaft e. The pinion-carrier has an end wall f', slidably engaging the hub of the internal gear on the driving-shaft, or it may be the driven-shaft, which admits of a slight axial movement of said carrier for the purpose of operating clutch-mechanism which is arranged between said end wall and the crown of the internal gear, thereby to connect said pinion-carrier with the driven-shaft, and in the operation of the gearing to cause the driven-shaft to be revolved by the driving-shaft in the same direction of rotation or forward. Said pinion-carrier is moved axially by means connected with a thrust collar 72, which is mounted on the driven-shaft, and adapted to be moved by a pivoted actuating-lever 78.

The reversing-gearing in addition to connecting the driven-shaft e with the driving-shaft, whereby said driven-shaft e is revolved by the driving-shaft, in the same direction, or forward, is also designed to connect the driven-shaft e with the driving-shaft, whereby said driven-shaft e is revolved by the driving-shaft, in the opposite direction, or backward, and in such case the brake-mechanism is brought into action and the clutch-mechanism is disengaged; and said gearing is also designed to disconnect the driven-shaft from the driving-shaft, whereby the driven-shaft may remain idle. Therefore the actuating-lever of the reversing gearing is designed to be operated to move the parts of the reversing-gearing into three different positions whereby these three separate results may be accomplished.

When the actuating-lever is moved into the position shown in Fig. 1, the brake-mechanism is designed to be operated to arrest the pinion-carrier, and when arrested the intermediate gears or pinions are revolved on their axes by the spur-gear instead of being moved planetarily about said spur-gear, and the internal gear is revolved by them, and the driven-shaft is revolved in a direction opposite to the direction of rotation of the driving-shaft. With the actuating lever in this position the clutch-mechanism between the pinion-carrier and the internal gear is disengaged. The brake-mechanism here shown is located at the end of the pinion-carrier, between said carrier and the end wall 15, of one end portion 12 of a stationary shell, which incloses and protects the gearing. Said brake-mechanism comprises a plurality of friction-plates, arranged in two sets, there being one or more plates in one set connected with said stationary shell, or to some other fixed support, arranged at the end of the pinion-carrier, and there being one or more plates in the other set connected with the pinion-carrier, and the plates of one set are arranged alternately, with respect to the plates of the other set and all of said plates are arranged in parallelism, close together, so that but a slight axial movement is required to cause them to engage and disengage each other. As here shown, the inner face of the end wall 15 of the fixed support, is prepared to form a friction face and to serve as a non-rotatable stationary friction-plate, which resists axial movement of the other friction-plates.

16, 17, 18 and 19 represent other non-rotatable friction-plates, any one or more of which may be employed as may be required, and said plates are made as thin annular disks or rings formed on each side with a friction face; and said plates are provided with projections 20 on their outer edges which enter recesses formed on the inner cylindrical wall of the fixed support. Said plates are thus slidably connected with the fixed support, so that they may be moved axially. The endmost plate 19 is made thicker than the others and is located close to the end of the carrier, and is adapted to be engaged by a movable ring 21, which is employed to move it and the other plates axially, for the purpose of causing them to engage each other.

22, 23 and 24 represent the rotatable friction-plates which are connected with the pinion-carrier, any one or more of which may be employed. Said rotatable plates are likewise made as thin annular disks or rings formed on each side with a friction face, and said plates are provided with projections 25 on their inner edges which enter recesses formed in the outer edge of a ring 30, which is secured to the end of the pinion-carrier. Thus said rotatable plates are slidably connected with the pinion-carrier, so that they may be moved axially. Said ring 30 may be secured to the end of the pinion-carrier by extensions of the pinion-supports b', which extend through holes in said ring, or it may be otherwise secured thereto.

The end ring 19 of the set of non-rotatable plates is increased in width at two oppositely disposed portions (see Fig. 2) to form two engaging portions for the actuating-member or ring 21, and said member or ring 21 may be increased in width at corresponding portions, if desired, so that although said ring 21 engages the ring 19, the area of the engaging portions will be small. Said actuating-ring 21 encircles the carrier and is movable for the purpose of exerting endwise pressure upon the friction-plates to move them axially and cause them to engage each other, and to accomplish this result the lower end of said actuating-ring 21 rests on the fixed support against a boss 35, formed on the interior of said support, which serves as a fulcrum, and the upper end bears a roll 36, adapted to be engaged by an eccentric 37, secured to the pivot-shaft 38, of an actuating-lever 39, which is connected by a link 40 with the main actuating-lever 78. As the actuating-lever 39, is moved, the eccentric 37, will act to move the actuating-ring, to cause it to rock on the fulcrum, and thus exert endwise pressure upon the friction-plate 19, in a direction to move the friction plates axially toward the fixed end wall 15, and thus cause their friction-surfaces to engage. When thus engaged the carrier will be firmly held against rotation. When the actuating-lever 39 is moved in the opposite direction pressure upon the friction-plates is relieved, whereupon they are permitted to disengage each other sufficiently to permit rotation of the carrier.

When the clutch-mechanism is operated to connect the carrier with the driven-shaft through the intermediary of the internal gear, said carrier will be moved axially a very short distance, but sufficient to cause engagement of the members of the clutch-mechanism. During such movement the members of the brake-mechanism will remain disengaged, as axial movement of said carrier is permitted by the sliding connection of the plates therewith.

While the brake-mechanism is particularly adapted to the reversing-gearing here shown, yet it is obvious that it may be applied to other forms of reversing-gearing having the same general characteristics.

I claim:—

1. In a reversing-gearing, the combination with a driving-shaft and a driven-shaft, gears connected respectively with said shafts, pinions engaging said gears, a rotatable carrier for said pinions, which is movable axially, and a clutch to connect the carrier with the driven-shaft which is operated when said carrier is moved axially, of brake-mechanism to arrest and permit rotation of said carrier involving brake-members movable axially into and out of engagement, one or more of said members being non-rotatable, and one or more of said members being slidably connected with said carrier, permitting axial movement thereof and also relative axial movement of the carrier, and means for moving said brake-members axially, substantially as described.

2. In a reversing-gearing, the combination with a driving-shaft and a driven-shaft, gears connected respectively with said shafts, pinions engaging said gears, and a rotatable carrier for said pinions, of brake-mechanism to arrest and permit rotation of said carrier involving brake-members movable axially into and out of engagement with each other, and a fixed brake-member into and out of engagement with which the endmost brake-member is movable, one or more of said movable members being non-rotatable and one or more of said movable members being slidably connected with said carrier, and means for moving said movable brake-members axially, substantially as described.

3. In a reversing-gearing, the combination with a driving-shaft and a driven-shaft, gears connected respectively with said shafts, pinions engaging said gears, and a rotatable carrier for said pinions, of friction-plates movable axially into and out of engagement with each other, and a fixed friction-plate, one or more of said movable friction-plates being non-rotatable, and one or more of said movable friction-plates being slidably connected with said carrier, and means for sliding said plates in a direction toward the fixed friction-plate to engage each other and the endmost plate to engage said fixed friction-plate, substantially as described.

4. In a reversing-gearing, the combination of two shafts, gears connected respectively with said shafts, pinions engaging said gears, a rotatable carrier bearing said pinions, clutch-mechanism to connect said carrier with one of said shafts for forward drive, brake-mechanism to arrest said carrier for reverse drive involving friction plates movable axially into and out of engagement with each other, one or more of said plates being non-rotatable and one or more of said plates being slidably connected with the carrier, a stationary member having a friction surface to limit axial movements of said plates in one direction, and means to move said plates axially toward said limiting member for engagement and to permit movement thereof in the opposite direction for disengagement, substantially as described.

5. In a reversing-gearing, the combination with a driving-shaft and a driven-shaft, gears connected respectively with said shafts, pinions engaging said gears, a rotatable carrier for said pinions, of a stationary protecting shell inclosing the gearing having an end wall formed with a friction face and axially movable friction-plates connected respectively with said shell and with said carrier, and means for moving said plates axially into and out of engagement with each other and the endmost plate into and out of engagement with said end wall to arrest and permit rotation of the carrier, substantially as described.

6. In a reversing-gearing, the combination with a driving-shaft and a driven-shaft, gears connected respectively with said shafts, pinions engaging said gears, a rotatable carrier for said pinions, and a stationary protecting shell inclosing the gearing, of brake-mechanism to arrest and permit rotation of said carrier, arranged between said carrier and the end wall of said shell, a rocking-member to operate said brake-mechanism, and means to rock said member, substantially as described.

7. In a reversing-gearing, the combination of a driving-shaft and a driven-shaft, gears connected respectively with said shafts, pinions engaging said gears, a rotatable carrier for said intermediate gears, a clutch to connect said carrier with the driven-shaft, a protecting shell inclosing all of the gearing, a brake-mechanism to arrest and permit rotation of said carrier arranged between said carrier and the end wall of said shell, and means to operate said brake-mechanism, substantially as described.

8. In a reversing-gearing, the combination of a driving-shaft and a driven-shaft, gears connected respectively with said shafts, pinions engaging said gears, a rotatable carrier for said pinions which is axially movable, clutch-mechanism operated by said carrier when moved axially to connect it with and disconnect it from the driven-shaft, a non-rotatable friction-plate and a friction-plate slidably connected with said carrier to permit of axial movement into and out of engagement with the aforesaid friction-plate to arrest and permit rotation of said carrier, and means for moving said friction-plate axially, substantially as described.

9. In a reversing-gearing, the combination with a driving-shaft and a driven-shaft, gears connected respectively with said shafts, pinions engaging said gears, a rotatable carrier for said pinions, a non-rotatable friction-plate, a friction-plate slidably connected with and rotated by the carrier which is movable axially into and out of engagement with the non-rotatable friction-plate, a ring encircling the carrier which is fulcrumed at its lower end, and means to engage and rock said ring on its fulcrum to move the slidably connected friction-plate axially, substantially as described.

10. In a reversing-gearing, the combination with a driving-shaft and a driven-shaft, gears connected respectively with said shafts, pinions engaging said gears, a rotatable carrier for said pinions, a non-rotatable friction-plate, a friction-plate slidably connected with and rotated by the carrier which is movable axially into and out of engagement with the non-rotatable friction-plate, a ring encircling the carrier which is fulcrumed at its lower end, an eccentric secured to a pivot-shaft to engage the upper end of said ring to rock it, and means to move said eccentric, substantially as described.

11. In a reversing-gearing, the combination with a driving-shaft and a driven-shaft, gears connected respectively with said shafts, pinions engaging said gears, a rotatable carrier for said pinions, of a set of non-rotatable friction-plates, one of which is stationary and the remainder movable axially, and a set of friction-plates disposed alternately with respect to the aforesaid friction-plates which are slidably connected with and rotated by the carrier, the endmost plate of said second set having engaging portions at two oppositely disposed points, a ring encircling the carrier which engages said endmost plate at its engaging portions, and means to move said ring to move the endmost plate axially whereby the other plates are correspondingly moved, substantially as described.

12. In a reversing-gearing, the combination with a driving-shaft and a driven-shaft, gears connected respectively with said shafts, pinions engaging said gears, and a rotatable carrier for said pinions, of two sets of flat rings encircling the carrier having engaging faces, the rings of one set being disposed alternately with respect to the rings of the other set, a protecting-shell inclosing the gearing to which the rings of one set are slidably connected, the rings of the other set being slidably connected with the carrier, and means to apply endwise pressure upon said rings to move them axially, substantially as described.

13. In a reversing-gearing, the combination with two shafts, gears connected respectively with said shafts, pinions engaging said gears, a rotatable carrier for said pinions, of a ring secured to one end of said carrier having longitudinal recesses, a non-rotatable member arranged concentric with said ring having longitudinal recesses and two sets of annular friction plates arranged between said ring and non-rotatable member, the plates of one set being arranged alternately with respect to those of the other set and the plates of one set having projections at their inner edges to enter the recesses in the ring and the plates of the other set having projections at their outer edges to enter the recesses in the non-rotatable member, and means to move said plates axially thereby to arrest the carrier, substantially as described.

14. In a reversing-gearing, the combination of two shafts, gears connected respectively with said shafts, pinions engaging said gears, a rotatable carrier having pivot-shafts for said pinions and having a boss, a ring arranged on said boss and held in place by said pivot-shafts, said ring having longitudinal recesses, a non-rotatable member arranged concentric with said ring having longitudinal recesses and two sets of annular friction plates arranged between said ring and non-rotatable member, the plates of one set being arranged alternately with respect to those of the other set and the plates of one set having projections at their inner edges to enter the recesses in the ring and the plates of the other set having projections at their outer edges to enter the recesses in the non-rotatable member, and means to move said plates axially thereby to arrest the carrier, substantially as described.

15. In a reversing-gearing, the combination of two shafts, gearing indirectly connecting them together involving gears secured to the shafts and pinions engaging said gears, a rotatable carrier for said pinions, clutch-mechanism to connect said carrier with one of said shafts for forward drive and brake mechanism to arrest said carrier for reverse drive involving friction plates movable axially into and out of engagement with each other, one or more of said plates being non-rotatable and one or more of said plates being slidably connected with the carrier, a member held against axial movement to limit axial movements of said plates in one direction, and means to move said plates axially toward said limiting member for engagement and to permit movement thereof in the opposite direction for disengagement, substantially as described.

In testimony whereof, I have signed my name to this specification, in the presence of two subscribing witnesses.

HENRY A. TUTTLE.

Witnesses:
  B. J. NOYES,
  H. B. DAVIS.

---

Copies of this patent may be obtained for five cents each, by addressing the "Commissioner of Patents, Washington, D. C."